United States Patent
Zhao et al.

(10) Patent No.: US 11,644,839 B2
(45) Date of Patent: May 9, 2023

(54) SYSTEMS AND METHODS FOR GENERATING A REAL-TIME MAP USING A MOVABLE OBJECT

(71) Applicant: SZ DJI TECHNOLOGY CO. LTD., Shenzhen (CN)

(72) Inventors: Kaiyong Zhao, Shenzhen (CN); Yuewen Ma, Shenzhen (CN); Minglei Zhang, Shenzhen (CN)

(73) Assignee: SZ DJI TECHNOLOGY CO. LTD., Shenzhen (CN)

(*) Notice: Subject to any disclaimer, the term of this patent is extended or adjusted under 35 U.S.C. 154(b) by 222 days.

(21) Appl. No.: 16/656,431

(22) Filed: Oct. 17, 2019

(65) Prior Publication Data

US 2020/0051443 A1 Feb. 13, 2020

Related U.S. Application Data

(63) Continuation of application No. PCT/CN2017/082230, filed on Apr. 27, 2017.

(51) Int. Cl.
*G08G 5/00* (2006.01)
*G05D 1/10* (2006.01)
(Continued)

(52) U.S. Cl.
CPC ......... *G08G 5/0034* (2013.01); *B64C 39/024* (2013.01); *G01C 21/3848* (2020.08);
(Continued)

(58) Field of Classification Search
CPC .................................................. G08G 5/0034
See application file for complete search history.

(56) References Cited

U.S. PATENT DOCUMENTS 10,860,115 B1 * 12/2020 Tran ................... B64D 47/08
10,880,895 B2 * 12/2020 Gordaychik .......... H04L 1/1896
(Continued)

FOREIGN PATENT DOCUMENTS

CN 103970140 A 8/2014
CN 104062980 A 9/2014
(Continued)

OTHER PUBLICATIONS

Rosnell, T. et al., Point Cloud Generation from Aerial Image Data Acquired by a Quadrocopter Type Micro Unmanned Aerial Vehicle and a Digital Still Camera, Finnish Geodetic Institute, Geodeetinrinne 2, 02430 Masala, Finland, Sensors 2012, 12(1), 453-480; (https://doi.org/10.3390/s120100453)( Published: 4 Jan. 2.*
(Continued)

*Primary Examiner* — Jean Paul Cass
(74) *Attorney, Agent, or Firm* — Xsensus LLP

(57) ABSTRACT

Methods and systems for generating a real-time map of a survey area are provided. The methods and systems may include or be configured to carry out the steps of determining, based on a desired map resolution, a flight path over the survey area for a movable object having at least one image capture device. The methods and systems further may include obtaining images of the survey area captured by the at least one image capture device as the movable object travels along the flight path, and processing the images to generate the real-time map of the survey area with the desired map resolution.

15 Claims, 10 Drawing Sheets

(51) Int. Cl.
  *B64C 39/02* (2023.01)
  *G05D 1/00* (2006.01)
  *G06V 20/13* (2022.01)
  *G01C 21/00* (2006.01)

(52) U.S. Cl.
  CPC ....... *G01C 21/3852* (2020.08); *G05D 1/0088* (2013.01); *G05D 1/106* (2019.05); *G06V 20/13* (2022.01); *G08G 5/0039* (2013.01); *B64C 2201/127* (2013.01)

(56) References Cited

U.S. PATENT DOCUMENTS

| | | | | |
|---|---|---|---|---|
| 10,915,118 | B2* | 2/2021 | Boland | G05D 1/104 |
| 2005/0143902 | A1* | 6/2005 | Soulchin | G06T 17/05 |
| | | | | 701/532 |
| 2006/0132482 | A1* | 6/2006 | Oh | G06T 3/0012 |
| | | | | 345/419 |
| 2009/0254572 | A1* | 10/2009 | Redlich | G06Q 10/06 |
| 2010/0250497 | A1* | 9/2010 | Redlich | H04L 63/105 |
| | | | | 707/661 |
| 2015/0257000 | A1* | 9/2015 | Shi | H04W 12/08 |
| | | | | 455/418 |
| 2015/0285654 | A1* | 10/2015 | Kögler | G09B 29/106 |
| | | | | 701/409 |
| 2016/0119589 | A1* | 4/2016 | Tan | B66C 13/16 |
| | | | | 345/173 |
| 2016/0257000 | A1* | 9/2016 | Guerin | B25J 9/1671 |
| 2017/0090478 | A1* | 3/2017 | Blayvas | G06Q 10/04 |
| 2017/0131717 | A1* | 5/2017 | Kugelmass | G08G 5/0013 |
| 2017/0199051 | A1* | 7/2017 | Kim | G01C 21/3658 |
| 2017/0284812 | A1* | 10/2017 | Kim | G01C 21/3658 |
| 2017/0334559 | A1* | 11/2017 | Bouffard | G08G 5/0082 |
| 2018/0025235 | A1* | 1/2018 | Fridman | G01C 21/3852 |
| | | | | 382/103 |
| 2018/0188026 | A1* | 7/2018 | Zhang | G06T 7/593 |
| 2018/0188059 | A1* | 7/2018 | Wheeler | G05D 1/0088 |
| 2018/0202814 | A1* | 7/2018 | Kudrynski | G06V 20/588 |
| 2019/0137294 | A1* | 5/2019 | Jung | G01C 21/365 |
| 2019/0147331 | A1* | 5/2019 | Arditi | G06N 20/00 |
| | | | | 706/20 |
| 2019/0226853 | A1* | 7/2019 | Kubiak | G01C 21/3811 |
| 2019/0236966 | A1* | 8/2019 | Borgyos | G08G 5/0069 |
| 2019/0258251 | A1* | 8/2019 | Ditty | G06F 15/7807 |
| 2019/0340876 | A1* | 11/2019 | Northrup | G07F 17/3241 |
| 2019/0347820 | A1* | 11/2019 | Golinsky | G01C 21/3658 |
| 2019/0384294 | A1* | 12/2019 | Shashua | G05D 1/0253 |
| 2020/0051443 | A1* | 2/2020 | Zhao | G08G 5/0039 |
| 2020/0057488 | A1* | 2/2020 | Johnson | G06T 15/205 |
| 2020/0098135 | A1* | 3/2020 | Ganjineh | G06F 16/29 |
| 2020/0180612 | A1* | 6/2020 | Finelt | G06V 20/58 |
| 2020/0193686 | A1* | 6/2020 | Chong | G06T 15/06 |
| 2020/0223444 | A1* | 7/2020 | Bonanni | B60W 40/08 |
| 2020/0326203 | A1* | 10/2020 | Lund | H04W 4/027 |
| 2020/0353952 | A1* | 11/2020 | Suzuki | G01C 21/3407 |
| 2021/0056852 | A1* | 2/2021 | Lund | G08G 1/163 |
| 2021/0086370 | A1* | 3/2021 | Zhang | B25J 9/0084 |
| 2021/0094180 | A1* | 4/2021 | Szafir | G06V 20/10 |
| 2021/0101616 | A1* | 4/2021 | Hayat | G01C 21/3807 |
| 2021/0166376 | A1* | 6/2021 | Hernandez | G06T 5/006 |

FOREIGN PATENT DOCUMENTS

| | | | |
|---|---|---|---|
| CN | 105373132 | A | 3/2016 |
| CN | 205080435 | U | 3/2016 |
| CN | 105492985 | A | 4/2016 |
| CN | 105549619 | A | 5/2016 |
| CN | 105611277 | A | 5/2016 |
| CN | 105678754 | A | 6/2016 |
| CN | 106444841 | A | 2/2017 |
| CN | 109540126 | A * | 3/2019 |
| EP | 2884305 | A1 * | 6/2015 |
| KR | 101886013 | B1 * | 8/2018 ........... G06K 9/0063 |

OTHER PUBLICATIONS

NPL, Bevacqua, "Mixed-Initiative Planning and Execution for Multiple Drones in Search and Rescue Missions", Proceedings of the Twenty-Fifth International Conference on Automated Planning and Scheduling, DIETI, Universita degli Studi di Napoli Federico II via Claudio 21, 80125, Napoli, Italy, ICAPS. 2.*

International Search Report from the State Intellectual Property Office of the PR. China for International Application No. PCT/CN2017/082230, dated Jan. 26, 2018, 4 pages.

* cited by examiner

SYSTEMS AND METHODS FOR GENERATING A REAL-TIME MAP USING A MOVABLE OBJECT

CROSS REFERENCE TO RELATED PATENT APPLICATION

The present application is a continuation of International Patent Application PCT/CN2017/082230, filed Apr. 27, 2017, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to generating maps and, more particularly, to generating real-time maps using a movable object.

BACKGROUND

Unmanned aerial vehicles (UAVs), sometimes referred to as "drones," may be configured to carry a payload, such as cargo, optical equipment (e.g., photo cameras, video cameras, etc.), sensory equipment, or other types of payload. UAVs are recognized in many industries and in many situations as useful tools for performing certain tasks. For instance, UAVs have been used to conduct surveillance and collect various types of imaging and sensory data (e.g., photo, video, ultrasonic, infrared, etc.) in professional and recreational settings, providing flexibility and enhancement of human capabilities.

UAVs are known to capture images ("imagery") and transmit the image data to a user at a ground terminal for inspection. While this operation may be useful for generating real-time imaging data, existing techniques do not allow a wide area to be surveyed in real-time. For example, existing techniques include viewing a live-feed of image data captured by a camera on the UAV, which limits the user's field of view to that of the camera, or compiling captured image data in an offline process that does not allow a user to generate a real-time view of the survey area. For regions of interest where image data or map data is unavailable, the ability to survey the area and generate a real-time map without expensive post-processing would offer many advantages.

Accordingly, there is a need for improved systems and methods for generating real-time maps using a UAV, and in particular generating maps of a survey area that can be generated and viewed in real-time without inefficient offline processing.

SUMMARY

The present disclosure relates to systems and methods for generating a real-time map of a survey area. In the disclosed embodiments, a method may include determining, based on a desired map resolution, a flight path over the survey area for a movable object having at least one image capture device. The method may further include obtaining images of the survey area captured by the at least one image capture device as the movable object travels along the flight path, and processing the images to generate the real-time map of the survey area with the desired map resolution.

Further to the disclosed embodiments, systems and methods are provided for generating a real-time map of a survey area using a movable object with at least one image capture device. The system may include a memory having instructions stored therein and a controller including one or more processors configured to execute the instructions. The controller may be configured to execute the instructions to determine, based on a desired map resolution, a flight path over the survey area for the movable object, and obtain images of the survey area captured by the at least one image capture device as the movable object travels along the flight path. The controller may be further configured to process the images to generate the real-time map of the survey area with the desired map resolution.

In some disclosed embodiments, the present disclosure also relates to an UAV. The UAV may include a propulsion device, a communication device, at least one image capture device, a power storage device configured to power the propulsion device and the communication device, and a memory storing instructions. The UAV may further include a controller in communication with the communication device and configured to control the UAV to generate a real-time map. The controller may include one or more processors configured to execute the instructions to identify a survey area, determine, based on a desired map resolution, a flight path over the survey area for the UAV, and obtain images of the survey area captured by the at least one image capture device as the UAV travels along the flight path. The one or more processors may further be configured to execute the instructions to process the images to generate the real-time map of the survey area with the desired map resolution.

Further, in some disclosed embodiments, the present disclosure relates to a non-transitory computer readable medium storing instructions that, when executed by at least one processor, perform a method of generating a real-time map of a survey area. The method may include determining, based on a desired map resolution, a flight path over the survey area for a movable object having at least one image capture device, and obtaining images of the survey area captured by the at least one image capture device as the movable object travels along the flight path. The method may further include processing the images to generate the real-time map of the survey area with the desired map resolution.

DETAILED DESCRIPTION

Figure 1:
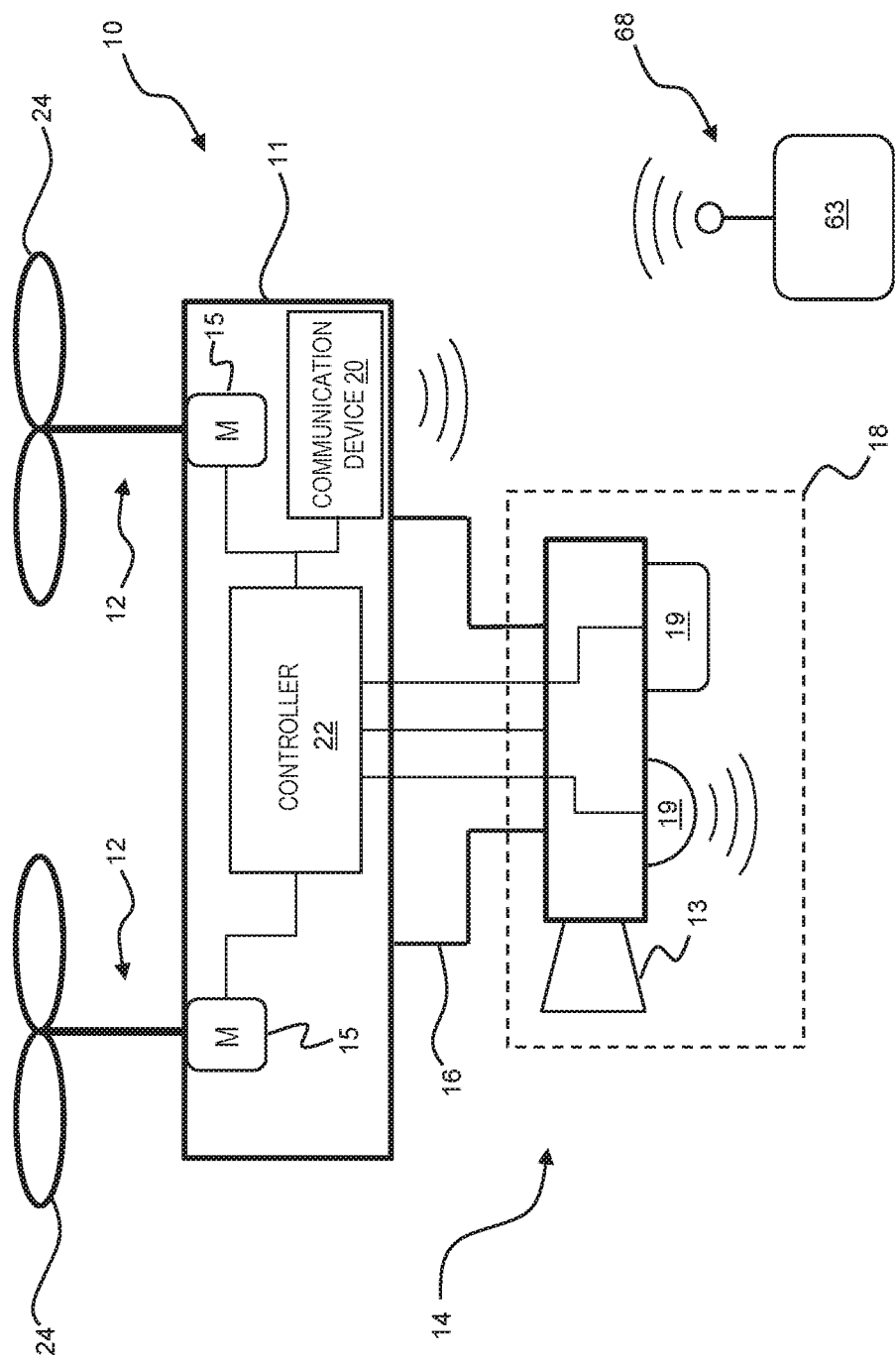
FIG. 1 is a schematic block diagram of an exemplary movable object having a control system consistent with embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 shows an exemplary movable object 10 that may be configured to move or travel within an environment. Movable object 10 may be any suitable object, device, mechanism, system, or machine configured to travel on or within a suitable medium (e.g., a surface, air, water, rails, space, underground, etc.). For example, movable object 10 may be an UAV. Although movable object 10 is shown and described herein as a UAV for exemplary purposes of this description, it is understood that other types of movable objects (e.g., wheeled objects, nautical objects, locomotive objects, other aerial objects, etc.) may also or alternatively be used in the disclosed embodiments consistent with this disclosure.

Although UAVs may be "unmanned," that is, operated without onboard personnel, they also may be fully or partially operated by off-board personnel who may be responsible for controlling multiple aspects of flight and/or other associated tasks (e.g., controlling cargo, operating imaging equipment, etc.). Thus, in many situations, the UAV operator is responsible for maintaining stable, controlled flight of the UAV, and for avoiding possible damage to the UAV or its cargo (e.g., which may be caused by collisions with other objects, hard landings, etc.). In other situations, the UAV may be fully or partially controlled by an automated flight control system, which may also be responsible for ensuring the UAV is operated effectively and without causing damage to the UAV or its cargo. As used herein, the term "UAV" may refer to an aerial device configured to be operated and/or controlled automatically (e.g., via an electronic control system) and/or manually by off-board personnel.

Referring to FIG. 1, movable object 10 may include, among other things, a housing 11, one or more propulsion assemblies 12, and a payload 14. The movable object also may include a controller 22, for example, which may be part of a larger control system as shown in the exemplary control system 23 of FIG. 2A. In some embodiments, payload 14 may be connected or attached to movable object 10 by a carrier 16, which may allow for one or more degrees of relative movement between payload 14 and movable object 10. In other embodiments, payload 14 may be mounted directly to movable object 10 without carrier 16. Movable object 10 may also include one or more sensors 19, a communication device 20, and a controller 22 in communication with the other components.

Movable object 10 may include one or more (e.g., 1, 2, 3, 4, 5, 10, 15, 20, etc.) propulsion devices, such as one or more propulsion assemblies 12 positioned at various locations (for example, top, sides, front, rear, and/or bottom of movable object 10) for propelling and steering movable object 10. Propulsion assemblies 12 may be devices or systems operable to generate forces for sustaining controlled flight. Propulsion assemblies 12 may share or may each separately include or be operatively connected to a power source 15, such as a motor M (e.g., an electric motor, hydraulic motor, pneumatic motor, etc.) or an engine (e.g., an internal combustion engine, a turbine engine, etc.). A power storage device 17 (FIG. 2A) may provide energy to the power source 15 and may include a battery bank, a fuel source, etc., or combinations thereof. Each propulsion assembly 12 may also include one or more rotary components 24 drivably connected to the power source 15 and configured to participate in the generation of forces for sustaining controlled flight. For instance, rotary components 24 may include rotors, propellers, blades, nozzles, etc., which may be driven on or by a shaft, axle, wheel, hydraulic system, pneumatic system, or other component or system configured to transfer power from the power source. Propulsion assemblies 12 and/or rotary components 24 may be adjustable (e.g., tiltable) with respect to each other and/or with respect to movable object 10. Alternatively, propulsion assemblies 12 and rotary components 24 may have a fixed orientation with respect to each other and/or movable object 10. In some embodiments, each propulsion assembly 12 may be of the same type. In other embodiments, propulsion assemblies 12 may be of different types. In some embodiments, all propulsion assemblies 12 may be controlled in concert (e.g., at the same speed and/or angle). In other embodiments, one or more propulsion devices may be independently controlled with respect to, e.g., speed and/or angle.

Propulsion assemblies 12 may be configured to propel movable object 10 in one or more vertical and horizontal directions and to allow movable object 10 to rotate about one or more axes. That is, propulsion assemblies 12 may be configured to provide lift and/or thrust for creating and maintaining translational and rotational movements of movable object 10. For instance, propulsion assemblies 12 may be configured to enable movable object 10 to achieve and maintain desired altitudes, provide thrust for movement in all directions, and provide for steering of movable object 10. In some embodiments, propulsion assemblies 12 may enable movable object 10 to perform vertical takeoffs and landings (i.e., takeoff and landing without horizontal thrust). In other embodiments, movable object 10 may require constant minimum horizontal thrust to achieve and sustain flight. Propulsion assemblies 12 may be configured to enable movement of movable object 10 along and/or about multiple axes and along a flight path, as described below in connection with FIG. 5.

Payload 14 may include one or more sensors 18. Sensors 18 may include devices for collecting or generating data or information, such as surveying, tracking, and capturing images or video of targets (e.g., objects, landscapes, subjects of photo or video shoots, etc.). Sensors 18 may include one or more image capture devices 13 configured to gather data that may be used to generate images. For example, imaging capture devices 13 may include photographic cameras, video cameras, infrared imaging devices, ultraviolet imaging devices, x-ray devices, ultrasonic imaging devices, radar devices, etc. Sensors 18 may also or alternatively include sensor devices 19 for range-finding or for capturing visual, audio, and/or electromagnetic signals.

Sensor devices 19 may also or alternatively include devices for measuring, calculating, or otherwise determining the position or location of movable object 10. For instance, sensor devices 19 may include devices for determining the height (i.e., distance above the ground) of movable object 10 and/or the altitude (i.e., with respect to sea level) of movable object 10. Sensor devices 19 may include optical sensors (e.g., cameras, binocular cameras, etc.), ultrasonic sensors, barometers, radar systems (e.g., millimeter wave radar), laser systems (e.g., LIDAR, etc.), etc. In some embodiments, movable object 10 may be equipped with multiple sensor devices 19, each operable to generate a different measurement signal. Sensor devices 19 may also or alternatively be or include devices for determining the movements, orientation, and/or location of movable object 10, such as a positioning device 46 for a positioning system (e.g., GPS, GLONASS, Galileo, Beidou, GAGAN, etc.), motion sensors, inertial sensors (e.g., IMU sensors), proximity sensors, image sensors, etc. Sensor devices 19 may also include devices or be configured to provide data or information relating to the surrounding environment, such as weather information (e.g., temperature, pressure, humidity, etc.), lighting conditions, air constituents, or nearby obstacles (e.g., objects, structures, people, other vehicles, etc.)

Carrier 16 may include one or more devices configured to hold the payload 14 and/or allow the payload 14 to be adjusted (e.g., rotated) with respect to movable object 10. For example, carrier 16 may be a gimbal. Carrier 16 may be configured to allow payload 14 to be rotated about one or more axes, as described below. In some embodiments, carrier 16 may be configured to allow 360° of rotation about each axis to allow for greater control of the perspective of the payload 14. In other embodiments, carrier 16 may limit the range of rotation of payload 14 to less than 360° (e.g., ≤270°, ≤210°, ≤180, ≤120°, ≤90°, ≤45°, 30°, ≤15°, etc.), about one or more of its axes.

Figure 2A:
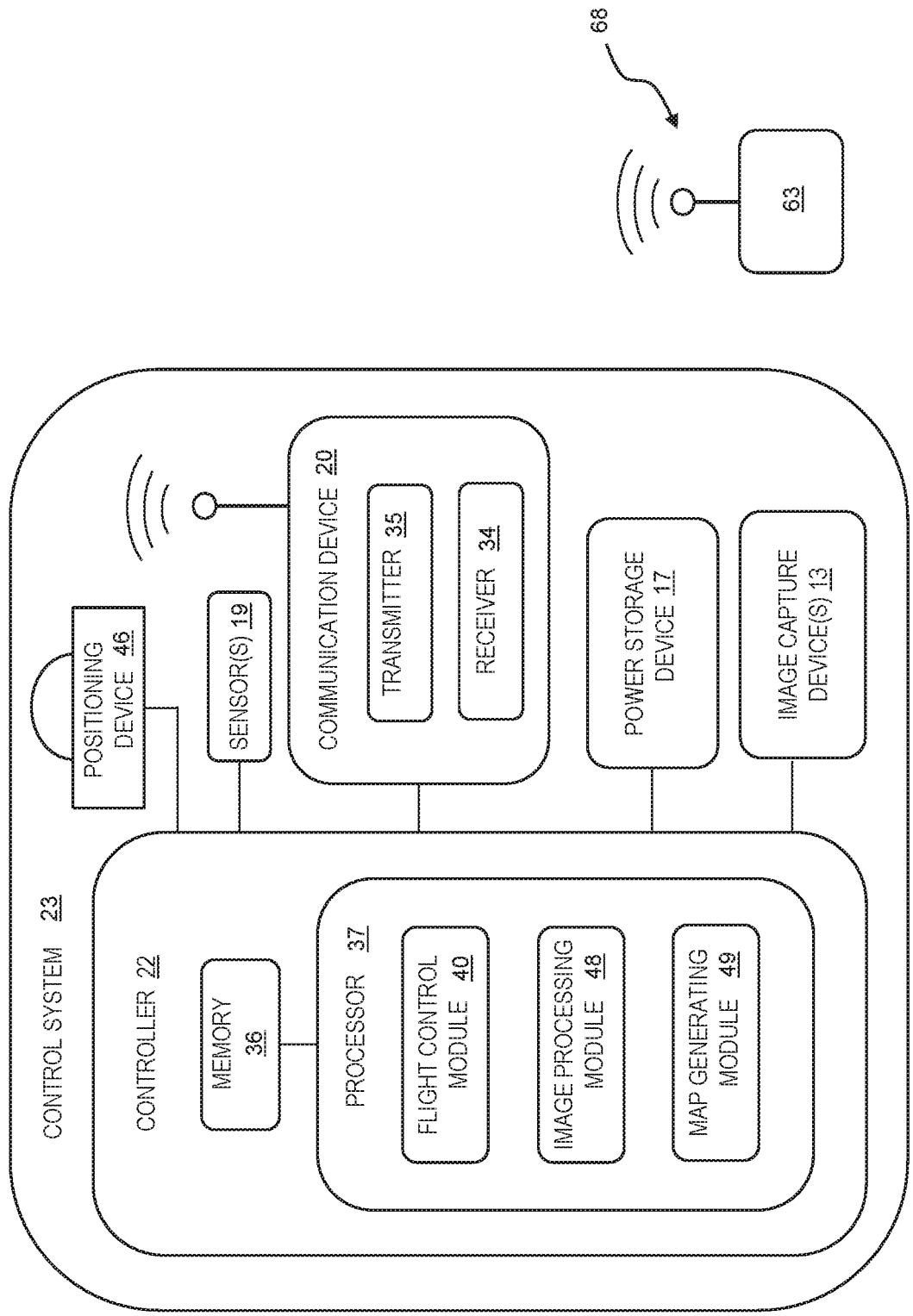
FIG. 2A is a schematic block diagram of an exemplary control system of a movable object consistent with embodiments of the present disclosure.

FIG. 2A shows an exemplary control system 23 of the movable object 10 consistent with the disclosed embodiments. Control system 23 is configured to control the movable object 10 and receive inputs from off-board entities. Control system 23 may include sensor devices 19, positioning device 46, communication device 20, image capture devices 13, and the propulsion assemblies 12, all in communication with controller 22. Controller 22 may include one or more components, for example, a memory 36 and at least one processor 37. Memory 36 may be or include non-transitory computer-readable media and can include one or more memory units of non-transitory computer-readable media. Non-transitory computer-readable media of memory 36 may be or include any type of volatile or non-volatile memory, for example, including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Memory units may include permanent and/or removable portions of non-transitory computer-readable media (e.g., removable media or external storage, such as an SD card, RAM, etc.).

Information and data obtained from the sensor devices 19 and/or image capture devices 13 may be communicated to and stored in non-transitory computer-readable media of memory 36. Non-transitory computer-readable media associated with memory 36 may also be configured to store logic, code and/or program instructions executable by processor 37 or any other processor to perform embodiments of the methods described herein. For example, non-transitory computer-readable media associated with memory 36 may be configured to store computer-readable instructions that, when executed by processor 37, cause the processor to perform a method comprising one or more steps. The method performed by the processor based on the instructions stored in the non-transitory computer readable media may involve processing inputs, such as inputs of data or information stored in the non-transitory computer-readable media of memory 36, inputs received from an external terminal 63, inputs received from sensor devices 19 and/or image capture devices 13 (e.g., received directly or retrieved from memory), and/or other inputs received via communication device 20. The non-transitory computer-readable media may be configured to store sensing data from sensor device 19 and images from image capture devices 13 to be processed by processor 37. The non-transitory computer-readable media may also be configured to transmit sensing data from sensor device 19 and images from image capture devices 13 to the terminal 63 for processing. In some embodiments, the non-transitory computer-readable media can be used to store the processing results produced by processor 37.

Processor 37 of the exemplary control system 23 of movable object 10 may include one or more processors and may embody a programmable processor, e.g., a central processing unit (CPU). Processor 37 may be operatively coupled to memory 36 or another memory device configured to store programs or instructions executable by processor 37 for performing one or more method steps. It is noted that method steps described herein may be stored in memory 36 and configured to be carried out by processor 37 to cause the method steps to be carried out by the processor 37.

In some embodiments, processor 37 of movable object 10 may include and/or alternatively be operatively coupled to one or more modules, such as a flight control module 40, an image processing module 48, and a map generating module 49. Flight control module 40 may be configured to help control propulsion assemblies 12 of movable object 10 adjust the spatial disposition, velocity, and/or acceleration of the movable object 10 with respect to six degrees of freedom (e.g., three translational directions along its coordinate axes and three rotational directions about its coordinate axes) to enable movable object 10 to follow a flight path. Image processing module 48 may be configured to receive and process images captured from the one or more image capture devices 13 or from memory 36. The images may be at least partially processed before being transmitted to offboard entities (e.g., terminal 63) and/or provided to the flight control module 40. However, either processed or raw images may be used for controlling and adjusting the position of the propulsion assemblies 12 of movable object 10 while following a flight path using flight control module 40. Map generating module 49 may be configured to generate a real-time map of the survey area using one or more of the captured images from image capture device 13 and images stored in memory 36. The map generating module 49 may process captured image data, including but not limited to unprocessed image data, image data that has been at least partially processed, e.g., by image processing module 48, and/or image data that has been stitched together or otherwise combined, e.g., by image processing module 48. Flight control module 40, image processing module 48, and map generating module 49 may be implemented in software for execution on processor 37, or may be implemented in hardware and/or software components separate from processor 37 (not shown in the figure). For example, software for implementing at least a portion of the flight control module 40, image processing module 48, or map generating module 49 may be stored in memory 36. In some embodiments, for example, one or more of flight control module 40, image processing module 48, and map generating module 49 may be stored on an offboard entity (e.g., in a ground station) rather than on the movable object 10.

Processor 37 can be operatively coupled to the communication device 20 and configured to transmit and/or receive data from one or more external devices (e.g., terminal 63, other movable objects, and/or other remote controllers). Communication device 20 may be configured to enable communications of data, information, commands, and/or other types of signals between controller 22 and off-board entities. Communication device 20 may include one or more components configured to send and/or receive signals, such as receiver 34, transmitter 32, or transceivers that are configured to carry out one- or two-way communication. Components of communication device 20 may be configured to communicate with off-board entities via one or more communication networks, such as radio, cellular, Bluetooth, Wi-Fi, RFID, wireless local area network (WLAN) network, wide area networks (WAN), infrared, point-to-point (P2P) networks, cloud communication, particular wireless protocols, such as, for example, IEEE 802.15.1, IEEE 802.11, and/or other types of communication networks usable to transmit signals indicative of data, information, commands, and/or other signals. For example, communication device 20 may be configured to enable communications with user input devices for providing input for controlling movable object 10 during flight, such as a remote terminal 63. Communication device 20 may also be configured to enable communications with other movable objects.

The components of controller 22 can be arranged in any suitable configuration. For example, one or more of the components of the controller 22 can be located on movable object 10, carrier 16, payload 14, terminal 63, sensors 18, or on an additional external device in communication with one or more of the above. In some embodiments, one or more processors or memory devices can be situated at different locations, such as on the movable object 10, carrier 16, payload 14, terminal 63, sensors 19, or on an additional external device in communication with one or more of the above, or suitable combinations thereof, such that any suitable aspect of the processing and/or memory functions performed by the system can occur at one or more of the aforementioned locations.

Figure 2B:
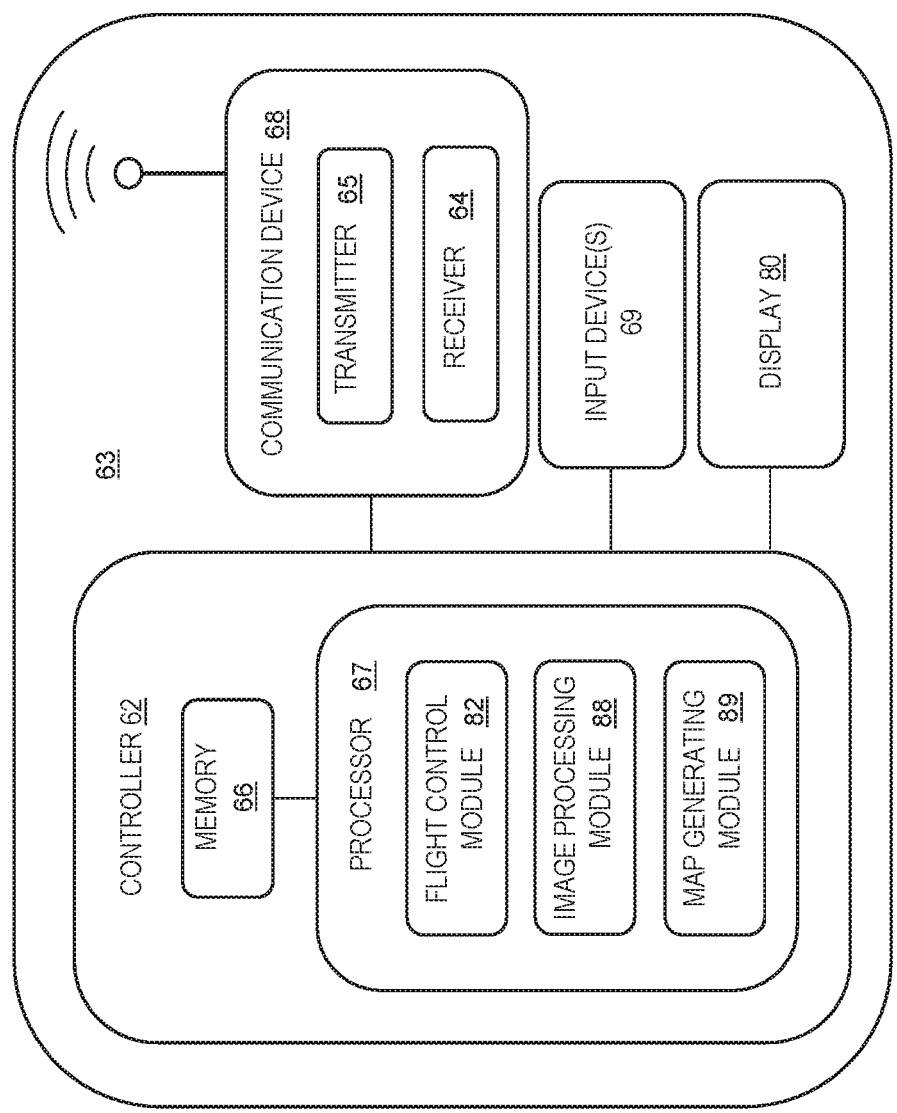
FIG. 2B is a schematic block diagram of an exemplary user terminal consistent with embodiments of the present disclosure.
Figure 3:
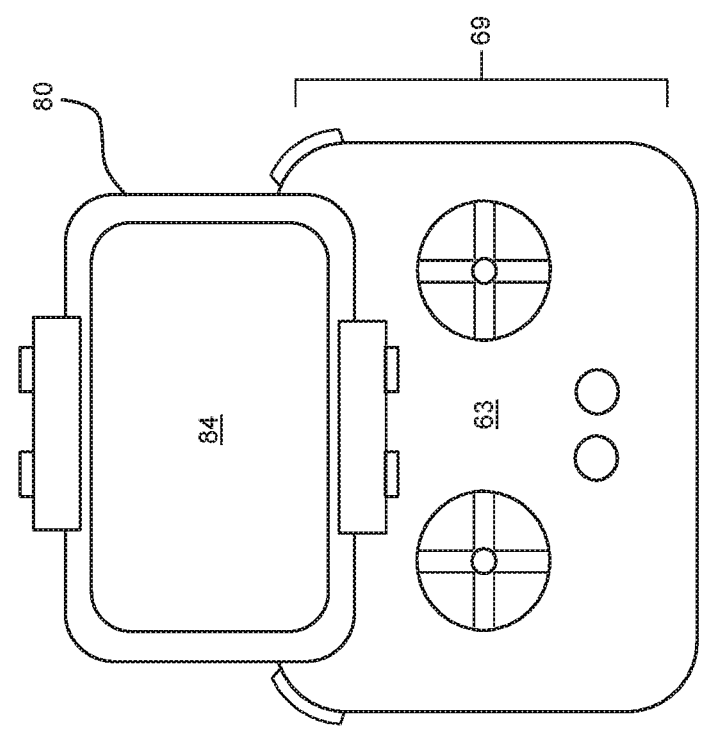
FIG. 3 is a schematic diagram of exemplary controls and a display that may be included in an exemplary terminal consistent with embodiments of the present disclosure.

Referring now to FIGS. 2B and 3, terminal 63 may be configured to receive input, such as input from a user (i.e., user input), and communicate signals indicative of the input to the controller 22. Terminal 63 may be configured to receive input and generate corresponding signals indicative of one or more types of information, such as control data (e.g., signals) for moving or manipulating movable device 10 (e.g., via propulsion assemblies 12), payload 14, and/or carrier 16. Terminal 63 also may be configured to receive data and information from movable object 10, such as operational data relating to, for example, positional data, velocity data, acceleration data, sensing data, image data, and other data and information relating to movable object 10, its components, and/or its surrounding environment. Terminal 63 further may be configured to receive images from movable object 10 captured by image capture device 13. Terminal 63 may be a remote controller with physical sticks configured to control flight parameters, a remote computing device (e.g., a ground station), or a touch screen device, such as a smartphone or a tablet, with virtual controls for the same purposes, or an application on a smartphone or a table, or a combination thereof.

Terminal 63 may include a communication device 68 that facilitates communication of information between terminal 63 and other entities, such as movable object 10. Communication device 68 may include one or more antennae or other devices configured to send or receive signals. Terminal 63 may also include one or more input devices 69 configured to receive input from a user for communication to movable object 10. FIG. 3 shows one exemplary embodiment of terminal 63 including multiple input devices 69 configured to receive user inputs indicative of desired movements of movable object 10 (manual flight control settings, automated flight control settings, flight control assistance settings etc.) or desired control of carrier 16, payload 14, or other components. It is understood, however, that other possible embodiments or layouts of terminal may be possible and are within the scope of this disclosure.

FIG. 3 also shows that the exemplary terminal 63 includes a display device 80 for displaying images captured by the movable object 10 and/or the real-time map generated based on the images, as will be described with reference to FIGS. 5-7. Display device 80 may be configured to display and/or receive information to and/or from a user (e.g., relating to movements of movable object 10 and/or imaging data captured by image capture device 13). In some embodiments, display device 80 may be a multifunctional display device configured to display information on a multifunctional screen 84 as well as receive user input via the multifunctional screen 84. The multifunctional screen may be, for example, a touchscreen, a screen configured to receive inputs from a stylus, or any other multifunctional display device. For example, in one embodiment, display device 80 may be configured to receive one or more user inputs via multifunctional screen 84. In another embodiment, multifunctional screen 84 may constitute a sole input device for receiving user input. In some embodiments, display device 80 may be the display device of a separate electronic device, such as a cellular phone, a tablet, a computer, etc., in communication with terminal 63 and/or movable object 10. For example, terminal 63 (or movable object 10) may be configured to communicate with electronic devices having a memory and at least one processor, which electronic devices may then be used to provide user input via input devices associated with the electronic device (e.g., a multifunctional display, buttons, stored apps, web-based applications, etc.). Communication between terminal 63 (or movable object 10) and electronic devices may also be configured to allow for software update packages and/or other information to be received and then communicated to controller 22 or 62 (e.g., via communication device 20).

In some embodiments, terminal 63 may be or include an interactive graphical interface for receiving one or more user inputs. That is, terminal 63 may include a graphical user interface (GUI) and/or one or more graphical versions of input devices 69 for receiving user input. Graphical versions of terminal 63 and/or input devices 69 may be displayable on a display device (e.g., display device 80) or a multifunctional screen (e.g., multifunctional screen 84) and include graphical features, such as interactive graphical features (e.g., graphical buttons, text boxes, dropdown menus, interactive images, etc.). In some embodiments, terminal 63 may be or include a computer application (e.g., an "app") to provide an interactive interface on the display device or multifunctional screen of any suitable electronic device (e.g., a cellular phone, a tablet, etc.) for receiving user inputs.

Referring again to FIG. 2B, terminal 63 may also include controller 62, memory 66, one or more processors 67, and communication device 68 coupled to the controller 62. The components of the terminal 63 may be the same or equivalent to those components described above with respect to the control system 23 of the movable object 10 in FIG. 2A. For instance, memory 66 may be or include non-transitory computer-readable media and can include one or more memory units of non-transitory computer-readable media. The non-transitory computer-readable media associated with memory 66 may be configured to store logic, code and/or program instructions executable by processor 67 to perform any suitable embodiment of the methods described herein. For example, non-transitory computer-readable media associated with memory 66 may be configured to store computer-readable instructions that, when executed by processor 67, cause the processor 67 to perform a method comprising one or more steps. The method performed by the processor based on the instructions stored in the non-transitory computer readable media may involve processing inputs, such as inputs of data or information stored in the non-transitory computer-readable media of memory 66, inputs received from input devices 69, and/or inputs received via communication device 68. The non-transitory computer-readable media may be configured to store sensing data and images from image capture devices 13 to be processed by processor 67.

Processor 67 of terminal 63 may also include one or more processors and may embody a programmable processor, e.g., a CPU. Processor 67 may be operatively coupled to memory 66 or another memory device configured to store programs or instructions executable by processor 67 for performing one or more method steps. It is noted that method steps described herein may be stored in memory 66 and configured to be carried out by processor 67 to cause the method steps to be carried out by the processor 67.

In some embodiments, processor 67 of terminal 63 may include and/or alternatively be operatively coupled to one or more modules, such as a flight control module 82, an image processing module 88, and a map generating module 89. Flight control module 82, like flight control module 40 of movable object 10, may be configured to control propulsion assemblies 12 of movable object 10 and/or determine instructions for flight control module 40 of movable object 10 to enable movable object 10 to follow a flight path. Image processing module 88 may be configured to receive and process images captured from the one or more image capture devices 13 on movable object 10, from memory 66, or from another offboard entity. Image processing module 88 may further provide flight control module 82 with images, either at least partially processed or raw images, for use in controlling and adjusting the position of the propulsion assemblies 12 of movable object 10 while following a flight path. Map generating module 89 of terminal 63 may be configured to generate a real-time map of the survey area using one or more of the captured images received from movable object 10 and images stored in memory 66. The map generating module 89 may process captured image data, including but not limited to unprocessed image data, image data that has been at least partially processed, e.g., by image processing module 88, and/or image data that has been stitched together or otherwise combined, e.g., by image processing module 88. Flight control module 82, image processing module 88, and map generating module 89, like those on movable object 10, may be implemented in software for execution on processor 67, or may be implemented in hardware and/or software components separate from processor 67 (not shown in the figure).

Processor 67 of terminal 63 can be operatively coupled to the communication device 68 and be configured to transmit and/or receive data from one or more external devices (e.g., movable object 10, display device 80, other movable objects, and/or other remote controllers). These external devices may include mobile handheld devices. Moreover, in some embodiments the generation of the map may be accomplished in whole or in part by the one or more external devices after images are transmitted from terminal 63. Communication device 68 may be configured to enable communications of data, information, commands, and/or other types of signals between controller 62 and off-board entities. Communication device 68 may include one or more components configured to send and/or receive signals, such as receiver 64, transmitter 65, or transceivers configured to carry out one- or two-way communication. Components of communication device 68 may be configured to communicate with movable object 10 or other offboard entities via the one or more communication networks detailed above.

Map generating modules 49 and 89 may be configured to generate a map of the survey area in real-time. In particular, map generating module 49 on movable object 10, or map generating module 89 of terminal 63, or a combination of the two, may generate a map of the survey area as images of the survey area are being captured by image capture device 13. The process of generating the map therefore does not require prior imaging of the entire survey area to be mapped, or images that would need to be pre-processed by image processing module 48 or 88. Rather, map generating modules 49 and 89 may be configured to receive images and generate the map while movable object 10 is still capturing images for the entire survey area, thus allowing generation of a desired map for a user to view before images of the entire survey area are available. This reduces any delay between dispatch of movable object 10 and output of a map of the survey area, which may have applications where map information about a survey area is desired as soon as possible and on-demand.

Figure 4:
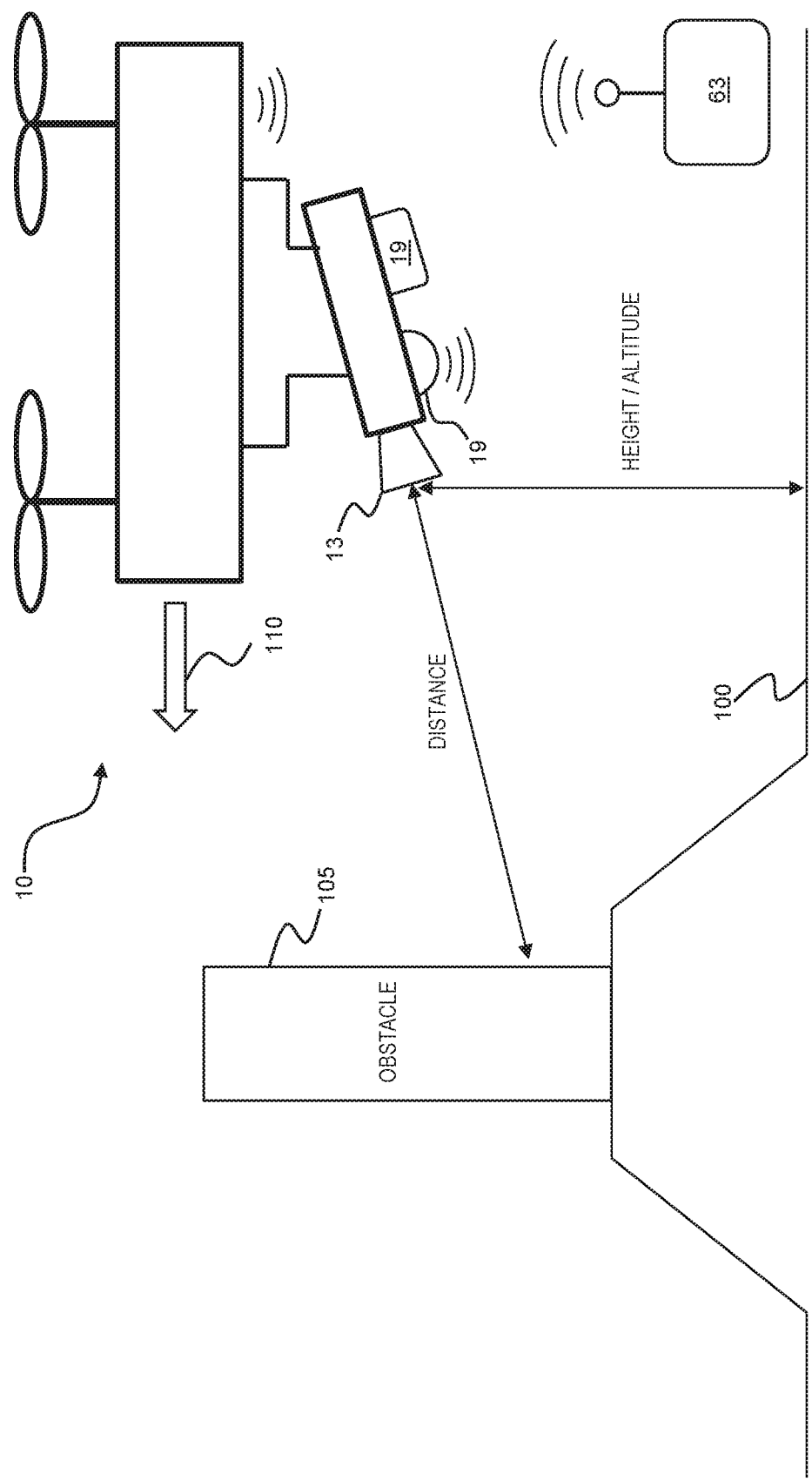
FIG. 4 is a schematic diagram of an exemplary system for generating a real-time map of a survey area in accordance with the disclosed embodiments.

Referring to FIG. 4, image capture device 13 may be used to capture images from movable object 10. As referenced above, this can be useful for creating maps of particular areas where no image data or map data is available, or where available image data or map data comprises an inadequate resolution for a desired purpose. Having no prior map data for an area may be a result of a survey area for which no maps are available (e.g., in sparsely populated or remote areas), or in situations where obtaining map data was not feasible. The latter case may include situations where data connections or other communication means (e.g., cellular TCP/IP connections, WiFi, etc.) are not available to the user to retrieve existing data, or where the size of map or imagery data is too large to be transmitted and/or stored on a user device (e.g., terminal 63, etc.) while in the field. In these and other situations, and in accordance with the disclosed embodiments, movable object 10 may be dispatched over a survey area 100 to capture images of the survey area to capture images for map generation. In some embodiments, movable object 10 communicates the captured images to terminal 63 where they are combined to form a real-time map. The communicated images may be raw images taken by image capture device 13 for processing by terminal 63, or they may be already-processed images in which controller 22 of movable object 10 has at least partially processed the images before communicating them to terminal 63. The images may be used to generate a map of the survey area 100 in real-time, where the real-time map may be displayed to a user on display device 80 of terminal 63. In other embodiments, processor 37 on movable object 10 may process the images to form the real-time map, which then may be communicated to terminal 63 for display to a user. In some embodiments, the real-time map generated by movable object 10 or terminal 63 may be used to guide further navigation or mission planning of movable object 10.

Movable object 10 captures images of the survey area 100 along a flight path 110. In accordance with the disclosed embodiments, flight path 110 may be determined based on a desired map resolution, and movable object 10 captures images of the survey area 100 while following the determined flight path 110. The flight path may be dynamically adjusted during flight, for example, to avoid obstacles 105 in the flight path 110 or to acquire image data needed to complete the real-time map. The flight path 110 may be determined by flight control module 82 of terminal 63, flight control module 40 of movable object 10, or using any combination of these flight control modules 82 and 40. At least one of the flight control modules 40 and 82 may determine the flight path 110 based on obtained inputs, including, for example, sensing data from sensors 19, image data from image capture device 13, position data from positioning device 46, map data from the generated map, and/or inputs from terminal 63 (including user inputs using input device 60). Inputs may also include the desired resolution of the map to be generated, the specifications of each image capture device 13, or any other feedback received from movable object 10 or terminal 63 as the movable object follows flight path 110. These inputs may be used to determine if the images captured by image capture device 13 are sufficient for generating a desired map of survey area 100, and/or to facilitate movable object 10 avoiding obstacles 105 along its flight path 110.

The flight path 110 may be determined based on the desired map resolution of the survey area, and also may be based on other factors including, for example: flight restrictions or other limitations on the ability of movable object 10 to move over the survey area (e.g., no-fly zones, flight restricted areas, such as airports or high security areas, etc.); the components and settings of movable object 10, such as the battery charge or fuel remaining, processing power, communication range, etc.; the characteristics and/or specifications of movable object 10 and image capture device 13 used to capture images (e.g., camera specifications, maximum altitude and speed of movable object, etc.); and the environment over the survey area (e.g., complexity of the landscape or terrain, weather conditions, available light, etc.). These exemplary factors, together with the map resolution, may be used in the determination of the flight path 110 for movable object 10.

Figure 5:
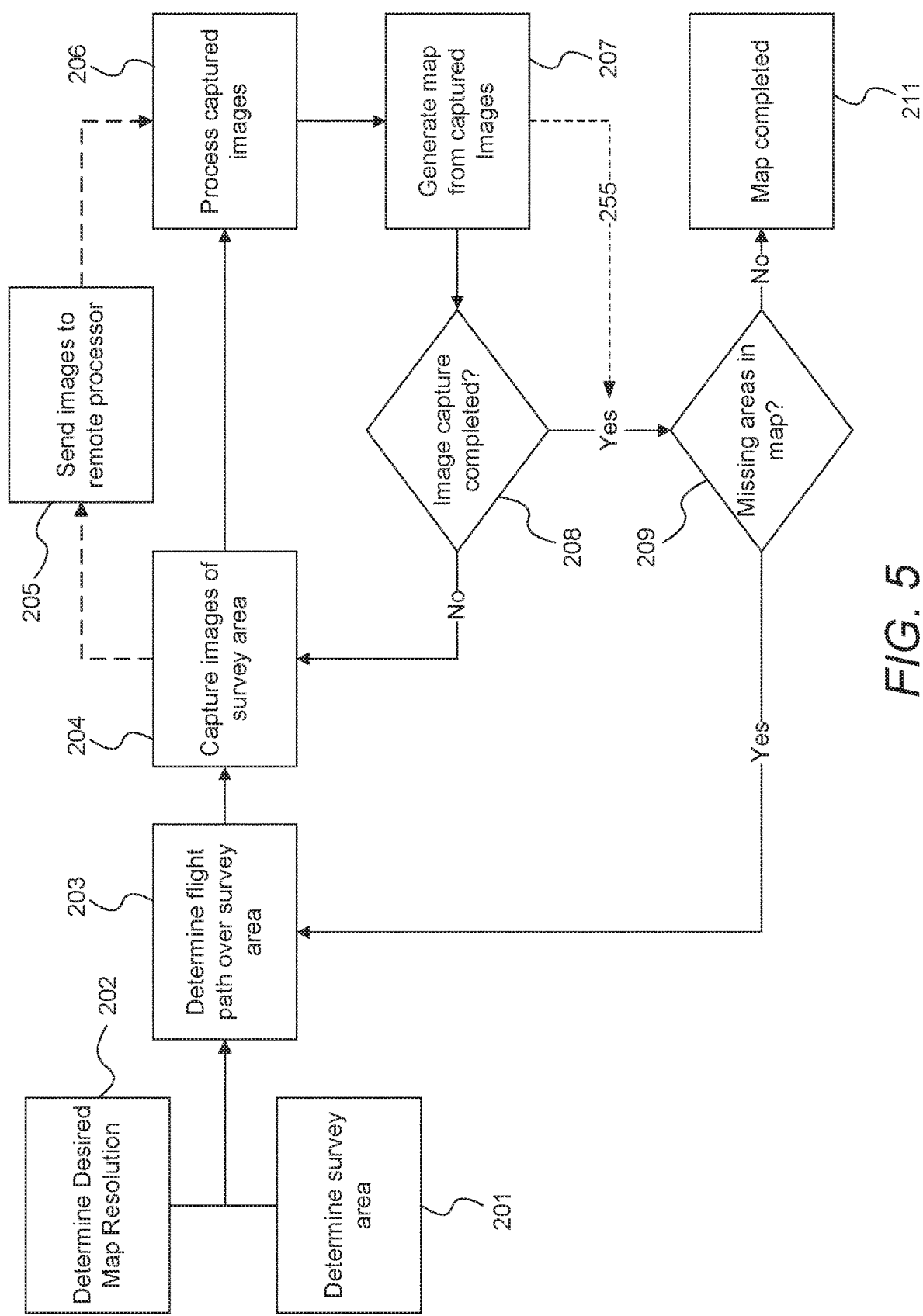
FIG. 5 is a flowchart illustrating an exemplary method for generating a real-time map of a survey area in accordance with the disclosed embodiments.

FIG. 5 shows an exemplary method for generating a real-time map of a survey area 100 using movable object 10 in accordance with the disclosed embodiments. FIG. 5 represents a process that can be performed by one or more processors on movable object 10, on terminal 63, or on another external device, or by using a combination thereof. The method may include determining a survey area (Step 201) and determining a desired map resolution (Step 202). At step 201, the survey area 100 may be determined by a user, by controller 22 of movable object 10, or by controller 62 of terminal 63, or any combination thereof. In one example, a user may require a map of a particular survey area where existing map data or image data may be insufficient or nonexistent. The user may designate the desired survey area 100, for example, using geographic coordinates from a GPS device or using an existing map, e.g., having insufficient data or resolution for the user's application. In some embodiments, the user may designate survey area 100 based on a geographic area surrounding the user or terminal 63 or the movable object 10 within a designated distance, direction, and/or shape, or based on any other manner in which a geographic area can be designated and instructions can be communicated to movable object 10.

The desired map resolution at step 202 is the desired resolution of a map to be generated from the images captured by the image capture device 13 of movable object 10. In some embodiments, the desired map resolution is an input that may be chosen by a user and used to determine the flight path 110 over the survey area 100 for the movable object 10 (Step 203). For example, the desired map resolution may be a desired spatial resolution for a real-time map, e.g., in which map features can be resolved to a desired accuracy. At step 203, the flight path may be determined by comparing the desired map resolution to one or more other inputs, including the specifications of the image capture device 13 (e.g., optical, electrical, or mechanical specifications), the environment to be imaged and traversed by movable object 10 (e.g., available ambient lighting, cloud cover, etc.), and any other factor that may affect the quality or resolution of the captured images. The specifications of image capture device 13 may include the known optical qualities of the image capture device lens and/or camera sensors, such as a frame rate, shutter speed, aperture, spectral response, as well as the type of image captured (e.g., optical, thermal, etc.), and so forth, and any other measure of image capture device quality that can affect resolution of the captured images.

From the desired map resolution and survey area, the flight path 110 may be determined at step 203. The determined flight path may include determining, for example, one or more of a height or altitude, or a heading of the movable object 10 along its flight path, a speed of movable object 10, one or more way points defining the flight path, a geographic distance between way points on the flight path, and/or a frequency for capturing images along the flight path. For example, at step 203, a higher desired map resolution may require determination of a lower-height flight path over the survey area, a slower speed, and/or multiple, overlapping passes over the survey area (e.g., more way points), as compared to a flight path that may be used to generate a map at a lower desired map resolution. In some embodiments, the image capture device 13 on movable object 10 may be configured to capture images continuously or periodically, and in other embodiments, the image capture device may capture images at one or more predetermined points, such as at one of more of the way points. In other embodiments, the flight path 110 may determine the attitude of the image capture device 13 at each waypoint and/or between waypoints (e.g., roll, pitch, yaw angles, etc.), the settings of the image capture device 13 (e.g., aperture, shutter speed, zoom, etc.), and the number of images to be captured and camera pose data to obtain at each waypoint and/or between waypoints.

The determination of the flight path at step 203 may include determination of an entire flight path over the survey area, from beginning to end, or only a portion of the flight path, or a modification to an existing flight path, preferably allowing the movable object 10 to determine the most optimal path to follow for obtaining images of the survey area 100. The determined flight path may include constraints placed on, or parameters given to, the movable object 10, which movable object uses to determine its own flight path, e.g., while moving over the survey area. The controller 22 (e.g., via flight control module 40) of movable object 10 may determine an exact position of the movable object 10, and may optimize the flight path 110 based on real-time conditions and one or more parameters associated with the movable object and/or survey area. Alternatively, movable object may communicate information to terminal 63, which in turn may use the information to optimize the flight path 110 for the movable object. In this manner, the remote terminal 63 and control system 23 of movable object 10 may alone, or in combination, carry out the step of determining the flight path over the survey area at step 203.

Determination of the flight path in step 203 may also include determining the necessary overlap between neighboring images captured of the survey area in order to generate the map without any missing areas or gaps. Traditional map generation generally involves high resolution imaging, but does not always account for or have the ability to control overlap between neighboring images. This results in missing areas in the resulting map. In some embodiments, the method shown in FIG. 5, including the flight path determined in step 203, may account for this problem by calculating an overlap ratio in real-time (e.g., the degree (such as percentage) of overlap between images of adjacent areas in the survey area relative to the size of the image). In this manner, missing portions of map data can be prevented by generating a flight path that ensures the entire survey area will be imaged with sufficient overlap between images capturing neighboring (i.e., adjacent) areas.

After flight path 110 is determined at step 203, movable object 10 follows the flight path and captures images of the survey area 100 using image capture device 13 (Step 204). Image capture device 13 may include one or more cameras that capture a plurality of images that may be processed to generate the real-time map.

As the movable object 10 captures images for the real-time map, sensing data also may be obtained from sensor devices 19 and/or from image capture device 13. The sensing data may include measured signals from sensor devices 19 and position data from positioning device 46. In some embodiments, sensing data from the image capture device 13 may include measured signals from any sensors on the image capture device 13 (including each camera), and/or on the carrier 16 or housing 11. The sensing data may be used to determine the orientation and/or position of image capture device 13 for each image, and/or the orientation and/or position of movable object 10 for each image. This sensing data may be used to determine camera pose information associated with each image and feature extraction when the images are processed (Step 206). Camera pose information may include position information and/or attitude information for the movable object 10 and/or image capture device 13. This allows, for instance, the captured images to be appropriately transformed to remove distortion and create overhead views of the survey area during processing, regardless of camera angle. Image processing at step 206 may be performed, for example, using image processing module 48 of movable object 10, image processing module 88 of terminal 63, or any combination thereof. In some embodiments (represented by the dotted line in FIG. 5), the captured images may be sent to terminal 63 or another remote system using communication device 20 so the captured images may be processed offboard of the movable object 10 (Step 205).

In some embodiments, camera pose information may be determined as the captured images are processed at step 206, for example, based in part on data in the captured images and/or sensing data. For captured images that include common scenes (e.g., overlapping views of the same portion of the survey area), the relative positions of the image capture device 13 can be recovered based on the relationship between the neighboring images. For example, some embodiments may use Structure Form Motion (SFM) or Simultaneous Localization and Mapping (SLAM) techniques to determine positions and attitudes of the image capture device based on the captured image data and/or sensing data, and also determine sparse point clouds of the captured images according to homologous image points (e.g., image data corresponding to the same objects in different images) in the neighboring images. In such embodiments, seven transformation parameters (three shift parameters, three rotation parameters, and one scaling parameter) may be calculated using three or more corresponding points in the point clouds. The image processing at step 206 may include using positions and attitudes of the image capture device 13 obtained from SFM or SLAM techniques and rigid transformations applied to the images' point clouds to normalize (e.g., under a world coordination system) the captured image data. After the positions and attitudes of the image capture device are obtained, e.g., under the world coordination system, a map of the survey area can be generated by performing digital differential rectification of the normalized image data. In such embodiments, corresponding colors may be applied to different ground features in areas of the map based on their relative geometries identified as the captured image data is processed. As images are captured (Step 204) and processed (Step 206), a real-time map of the survey area is generated (Step 207). The real-time map may be generated by processing and stitching the processed, captured images to create the map.

Figure 7:
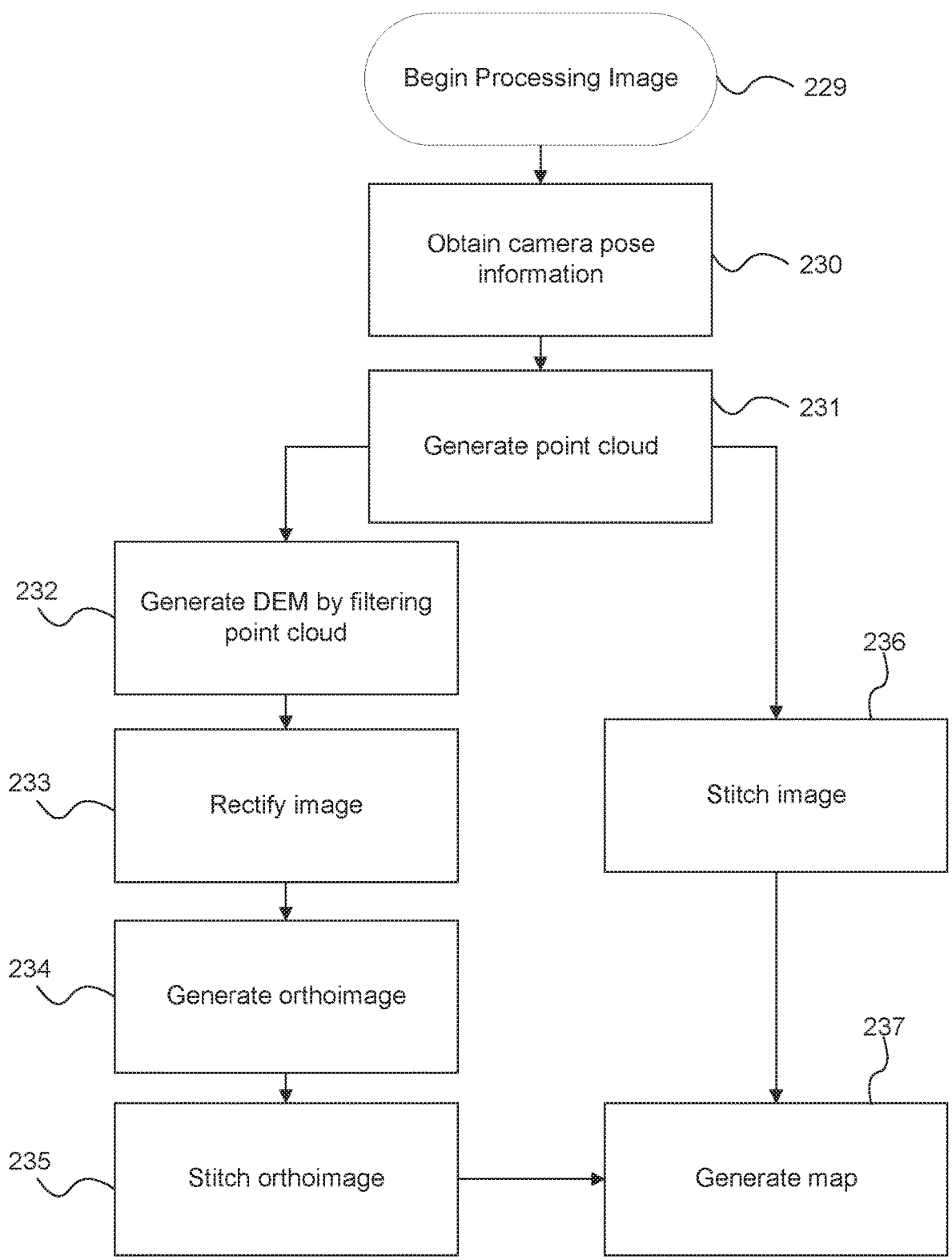
FIG. 7 is a flowchart illustrating an exemplary method that may be performed for processing images to generate a real-time map of a survey area in accordance with the disclosed embodiments.

FIG. 7 shows an exemplary method that may be performed to generate the real-time map at step 207 of FIG. 5. Processing begins at Step 229 on either the movable device 10 or terminal 63. In the latter case, raw image data may be communicated to terminal 63 for processing or, alternatively, some of the processing may be done on the movable object. During processing, camera pose information is obtained for each of the captured images (Step 230). As discussed above, camera pose information may include position information and/or attitude information for the movable object 10 and/or image capture device 13 used to capture the images. The camera pose information may be used to determine the image capture device's orientation relative to features that are extracted from each image, and can be used to make adjustments to the features and/or recognize features across different images and from different image capture device angles. Then, a point cloud is generated for the images (Step 231). Generating a point cloud may include identifying data points in the captured images corresponding to features of the image (e.g., feature extraction). The data points may be used as reference points that can be correlated (or otherwise associated) across different captured images having at least some of the same objects and features.

A digital elevation model (DEM) of the survey area can then be created by filtering the generated point clouds (Step 232). A DEM is a digital model representing the surface of terrain. In one embodiment, the DEM may be a two-dimensional (2D) model, as opposed to a three-dimensional (3D) model, reducing processing time and storage space. In another embodiment, the DEM may be a three-dimensional (3D) model. From the generated DEM of each image, the DEMs showing neighboring portions of the survey area can be directly stitched together (Step 236) to generate the map of the survey area (Step 237).

In some embodiments, further processing may be applied to each DEM to remove image distortions or to account for transformations caused by the changing attitude and positon of the image capture device 13 and/or the movable object 10 from image to image. These additional processing steps may be optional in the process of generating the real-time map. After generating the DEM (Step 232) as described above, each of the DEMs may be rectified based at least in part on the DEM and the camera pose information to generate rectified images (Step 233). Rectification involves applying one or more transformations to the DEMs to project points in the point clouds, regardless of the angle at which the image was captured, onto a common plane (e.g., onto a flat areal map showing views from a directly overhead perspective). The rectified images may be used to generate ortho-images with geographic coordinates (Step 234). Orthorectification removes scaling errors and distortions created by the projection of each image onto the common plane. The orthoimages may then be stitched together (Step 235) to generate the real-time map of the survey area (Step 237).

Referring again to FIG. 5, the map generated at step 207 may be available for display in real-time while the map is being created. Alternatively, the map also may be available for display after the movable object 10 has completed its flight path 110 over the survey area 100 and all captured images have been processed. In either case, the map may be displayed to a user using the display device 80 of terminal 63. This allows a user to quickly review and survey an area being mapped, where otherwise no map data or image data is available or the available map data or image data is of an insufficient quality or resolution for a particular application. In some embodiments, at step 207 the map may be generated in real-time or near real-time without offline processing (e.g., post-processing all images using a remote system).

As the map of the survey area is being generated at step 207, or after the entire survey area 100 has been mapped, the generated map may be further processed by incorporating it into an existing map. The existing map may include a lower resolution version of the survey area, or it may include surrounding areas around the survey area. Further, navigation instructions also may be generated and included on the generated real-time map. The navigation instructions may allow the user to accurately navigate the newly-mapped area(s) where previously a desirable path or feasible path could not have been generated.

As the movable object 10 follows the flight path 110, a determination is made, based on the generated map, whether movable object 10 has completed its flight path over the survey area 100 (Step 208). If the flight path has not been completely traversed, or if additional way points need to be generated to capture images over the entire survey area at step 208, the movable object 10 continues capturing images of the survey area (Step 204). If images have been captured covering the entire survey area at step 208, a determination is made (Step 209) whether the captured images are sufficient to generate a complete map of the entire survey area 100 at the desired resolution (e.g., are there missing areas of the map or areas with lower resolution than desired). If, at step 209, the entire survey area has been imaged and a map is generated at or above the desired resolution, the exemplary mapping process of FIG. 7 is concluded (Step 211). On the other hand, if there are areas of the map that are missing or are a lower resolution than desired, the process returns to step 203 to modify the existing flight path 110 and/or determine a new flight path for the movable object 10 to adequately capture images covering the missing or low-resolution areas.

In some embodiments, the determination of missing areas in the generated map and/or lower-than-desired resolution areas also may occur when the movable object 10 is following an existing flight path but before enough images have been captured to cover the entire survey area (dashed line 255). For instance, a user may desire real-time mapping of a particular area within the larger survey area before mapping other areas in the survey area. In such embodiments, the exemplary method of FIG. 6 may be used to request modification of the movable object's flight path 110 to focus on the particular area of interest in the survey area before capturing images of other areas in the survey area. For example, this could be achieved by redefining the survey area in the exemplary method of FIG. 5 to first create a real-time map of the smaller area of interest (e.g., redefined survey area) before performing the method to create the real-time map for the rest of the original survey area.

The determination to generate the real-time map may be initiated while movable object 10 is airborne or otherwise active over a survey area, and not necessarily prior to being dispatched by a user. In some embodiments, movable object 10 may determine that a particular area of a survey area requires capturing additional images to improve an existing map, or that no map data exists in a particular area. In these and similar cases, movable object 10 may determine, e.g., automatically, to capture images of a particular area (e.g., by determining a new survey area (Step 201), determining a flight path (Step 203), and capturing images (Step 204) along the flight path for map generation). Alternatively, this determination to capture images of a survey area can be made by users remote to the movable object 10, for instance, by users making inputs to terminal 63 or communicating with terminal 63 from another external device.

While movable object 10 is following its flight path 110, and capturing images along the flight path, the movable object may detect and avoid obstacles. These obstacles may include obstacles physically located in the movable object's flight path or obstacles that obscure a portion of the survey area from the perspective of the image capture device 13.

Figure 6:
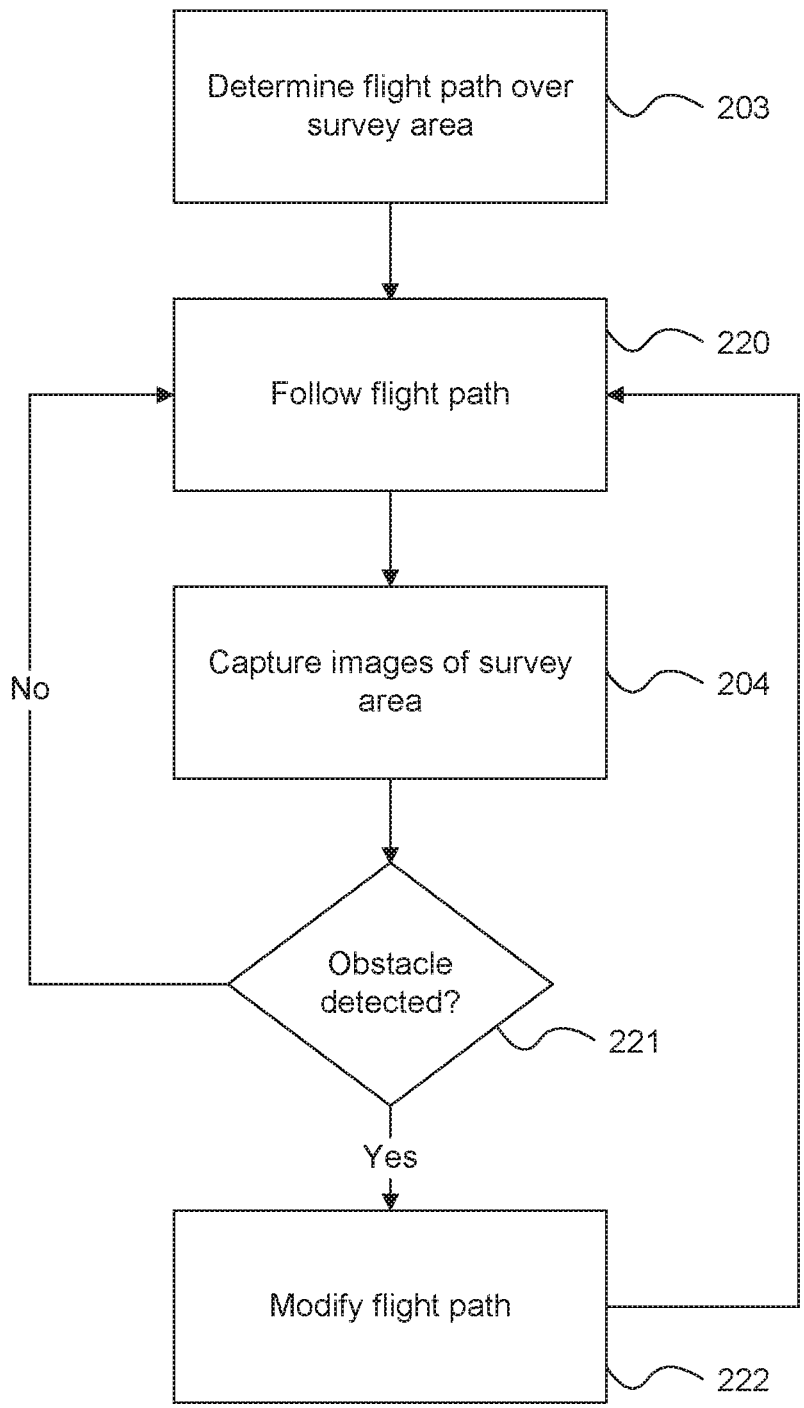
FIG. 6 is a flowchart illustrating an exemplary method that may be performed for detecting an obstacle while generating a real-time map of a survey area in accordance with the disclosed embodiments.

FIG. 6 shows a method for capturing images over the survey area while avoiding obstacles. The method may include determining a flight path over the survey area (Step 203), following the flight path (Step 220), and capturing images of the survey area along the flight path (Step 204). While following the flight path and capturing images, one or more of sensing data from sensor devices 19, image data from image capture device 13, position data from positioning device 46, and map data from the generated real-time map may be used to detect obstacles (Step 221). Obstacles may include flight-path obstacles obstructing the path of movable object 10, such as trees, buildings, and other objects. Obstacles also may include visual obstacles, such as physical objects obscuring a portion of the survey area, cloud cover, smoke, or other visual obstacles blocking or obscuring the survey area.

If an obstacle is detected (Step 221), the flight path is modified (Step 222). The flight path may be modified, for example, using flight control module 40 of movable object 10 and/or flight control module 82 of terminal 63. The modified flight path may cause the movable object 10 to avoid the obstacle, for example by creating a modified flight path that traverses around, over, under, or away from the obstacle. The modified flight path also may cause the movable object 10 to change its approach to the obstacle, circle the obstacle, and/or enter the obstacle to capture images of the survey area or otherwise avoid the obstacle. Moreover, if the obstacle is avoided and the modified flight path creates any missing or low-resolution area in the real-time map, the missing or low-resolution area can be subsequently determined (Step 209), e.g., and a new modified flight path can be determined (Step 203) to capture additional images of the missing or low-resolution area. If no obstacles are detected along movable object's flight path (Step 221, No), the movable object continues following its flight path.

Figure 8:
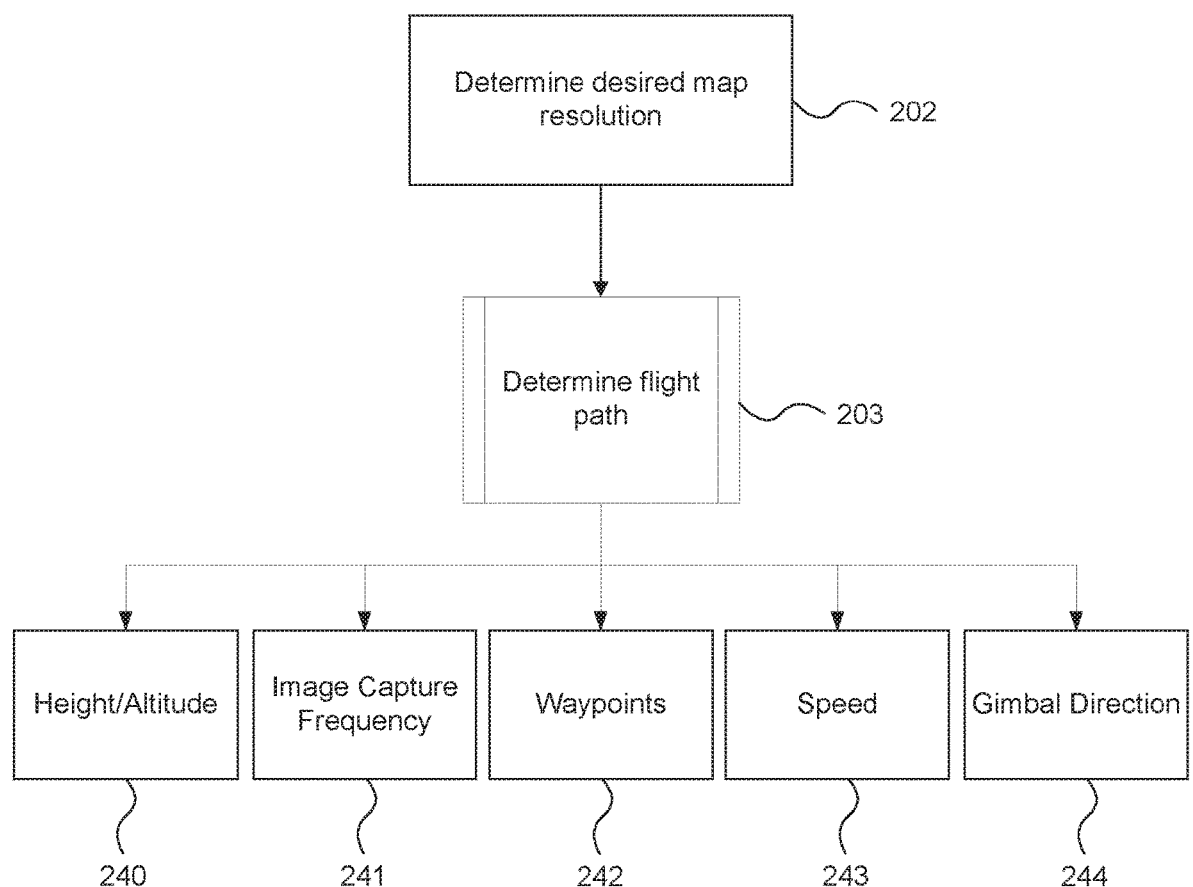
FIG. 8 is a schematic block diagram illustrating exemplary outputs when determining a flight path over a survey area to generate a real-time map in accordance with the disclosed embodiments.

FIG. 8 is a schematic block diagram showing exemplary information that may be generated when a flight path is determined in accordance with the embodiments described in FIG. 5. As described above, a desired map resolution (e.g., identified through user input, a predetermined setting stored in memory 36 or 66, or otherwise) is used to determine the flight path 110 of movable object 10 over the survey area (Steps 202, 203). Several types of information may be generated as a result of the flight path determination at step 203, including for example a determination of the height/altitude 240 of the movable object 10 along its flight path, a frequency 241 at which the image capture device 13 captures images while the movable object travels along the flight path, one or more way points 242 on the flight path, the speed 243 of movable object 10 along the flight path and between the way points 242, and at least one gimbal direction 244 for an image capture device 13 mounted to a gimbal (e.g., carrier 16). The gimbal direction may be set based on the flight path of movable object 10 and the survey area being imaged by image capture device 13, where the gimbal directs image capture device 13 toward the survey area as movable object 10 flies over or adjacent to the survey area.

Figure 9:
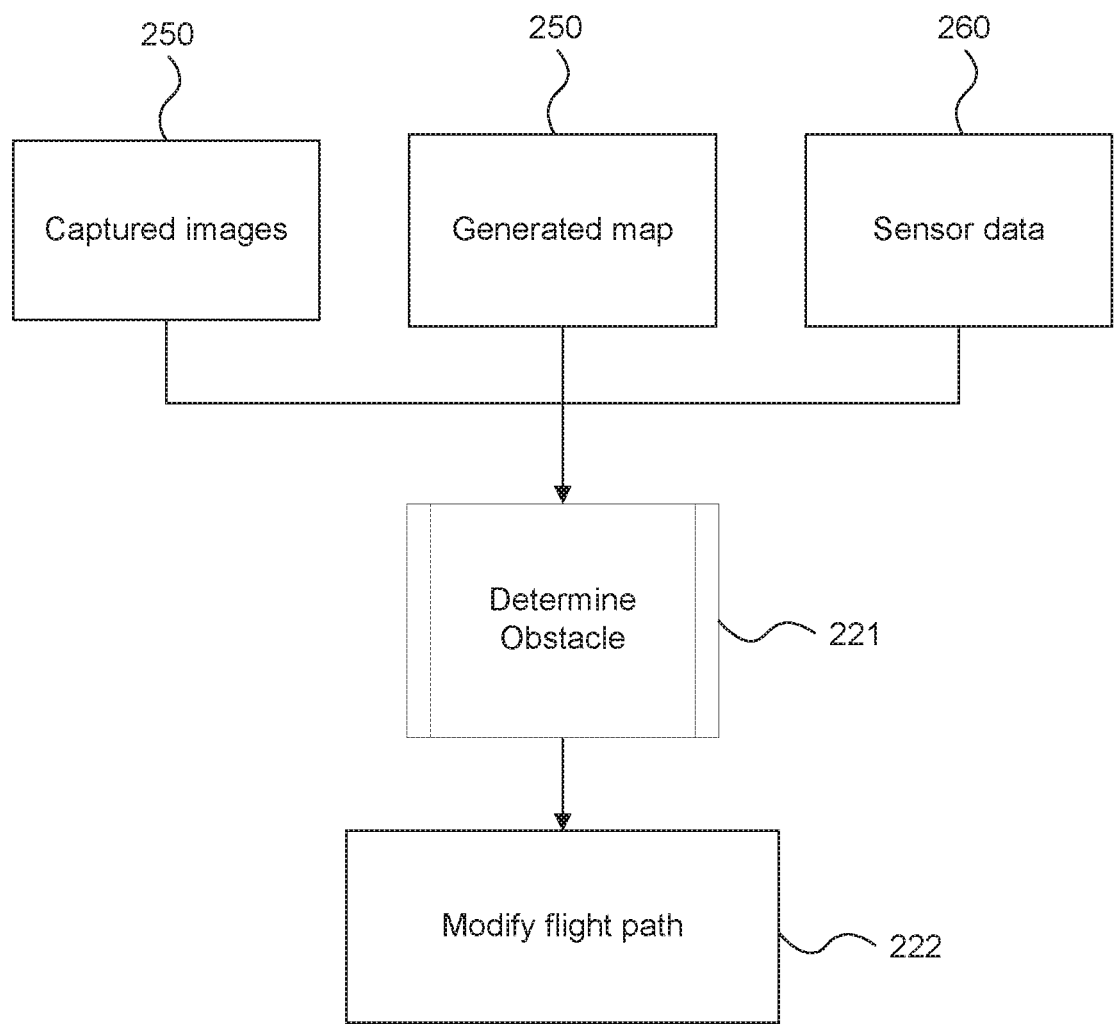
FIG. 9 is a schematic block diagram illustrating exemplary inputs used to determine an obstacle in a flight path over a survey area while generating a real-time map in accordance with the disclosed embodiments.

FIG. 9 is a schematic block diagram showing exemplary information that may be used to determine an obstacle in accordance with certain disclosed embodiments. As detailed above, at least the captured images 250, generated real-time map 260, and/or sensing data 270 may be used to identify an obstacle 221 in the flight path. Determining whether an obstacle is present may occur continuously as movable object 10 travels along its flight path, or alternatively, the determination may be made periodically (e.g., before capturing a next set of images from the image capture device, at certain time intervals, etc.). After an obstacle has been detected (e.g., whether as a physical obstacle in the flight path or an obstacle obstructing at least a portion of the survey area), the flight path may be modified at step 222 to avoid or address the obstacle. Modifications and adaptations of the embodiments will be apparent from consideration of the specification and practice of the disclosed embodiments. For example, the described implementations include hardware, firmware, and software, but systems and techniques consistent with the present disclosure may be implemented as hardware or software alone. The disclosed embodiments are not limited to the examples discussed herein.

For example, movable object 10 may generate the real-time map and use the map for flight path determination and obstacle avoidance using only a minimum amount of data necessary for those functions to conserve memory. In some embodiments, movable object 10 may only generate and store a real-time map sufficient to guide the movable object 10 over the survey area, as opposed to generating a highly-detailed, high-resolution map for use by a human user. When directed, or when movable object 10 determines a need, a real-time map of a desired resolution (e.g., a desired resolution sufficient for at least the movable object's navigation and obstacle avoidance) may be generated. When a desired resolution is below the highest possible resolution, the lower-resolution map generation may reduce the storage requirements for generating a real-time map in movable object 10, for example, when a real-time map is not required by the user or movable object 10 is merely generating the map to navigate over an area (e.g., generating maps for determining its own flight path and for avoiding obstacles). These maps may have a smaller field of view and a lower resolution, thereby reducing storage requirements while still generating an up-to-date map for movable object navigation than may have been previously available.

While the exemplary embodiments of generating real-time maps have been described using an image capture device, one or more image capture devices (e.g., one or more cameras) may be employed on movable object 10 to capture images of the survey area. This may allow for stereo images to be captured with each image capture instance (e.g., coordinated image captures by multiple image capture devices), may increase the field of view of the survey area with each image capture instance, and/or may allow for a higher frequency of images to be captured (e.g., multiple image capture devices capturing images at phase-shifted frequencies relative to one another). In such embodiments, the captured images, together with camera pose information from each of the individual image capture devices, may be processed according to the methods described above.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, non-transitory computer readable media, or existing communications software.

While illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with the true scope and spirit being indicated by the following claims and their full scope of equivalents.

What is claimed is:

1. A method of generating a real-time map of a survey area, the method comprising:
   determining, based on a desired map resolution selected by a user, a flight path over the survey area for a movable object having at least one image capture device prior to flight;
   obtaining images of the survey area captured by the at least one image capture device as the movable object travels along the flight path;
   processing the images to generate the real-time snap of the survey area with the desired map resolution;
   identifying a missing region in the real-time map of the survey area;
   modifying the flight path to capture images corresponding to at least a portion of the missing region;
   obtaining sensing data from one or more sensors of the movable object, the sensing data comprising position information or attitude information of the movable object; and
   determining camera pose information associated with each image captured by the at least one image capture device based at least in part on the obtained sensing data,
   wherein determining the flight path comprises:
   determining, based on the desired map resolution, one or more of a height of the movable object, a speed of the movable object, a geographic distance between way points of the flight path, or a frequency for capturing images, and
   wherein processing the images to generate the real-time map comprises:
   generating a point cloud from each of the images;
   generating a digital elevation model (DEM) of the survey area by filtering each of the generated point clouds;
   rectifying each of the images based at least in part on the DEM and camera pose information associated with each of the images to generate rectified images;
   generating orthoimages with geographic coordinates based on the rectified images; and
   stitching the orthoimages to create the real-time map of the survey area.

2. The method of claim 1, wherein the method is performed by at least one processor on the movable object.

3. The method of claim 1, wherein the method is performed at a remote terminal configured to receive the images of the survey area from the movable object.

4. The method of claim 1, wherein determining the flight path comprises:
   determining, based on the desired map resolution, the height of the movable object, the speed of the movable object, the geographic distance between way points of the flight path, and the frequency for capturing images.

5. The method of claim 1, wherein determining the flight path comprises:
   designating the survey area based on one or more of existing map data or existing image data, the existing map data or existing image data having a resolution lower than the desired map resolution; and
   identifying one or more way points along the flight path over the survey area.

6. The method of claim 1, wherein the sensing data comprises position or attitude information of the at least one image capture device.

7. The method of claim 1, further comprising:
   identifying an obstacle that prevents the at least one image capture device from capturing images corresponding to a portion of the survey area; and
   modifying the flight path to allow the at least one image capture device to capture the images corresponding to that portion of the survey area.

8. The method of claim 1, further comprising:
   identifying an obstacle in the flight path of the movable object; and
   modifying the flight path for the movable object to avoid the obstacle.

9. The method of claim 1, further comprising displaying the generated real-time map of the survey area on a remote controller.

10. The method of claim 1, further comprising generating navigation instructions on the generated real-time map of the survey area.

11. The method of claim 1, further comprising incorporating the generated real-time map of the survey area into an existing map.

12. A system for generating a real-time map of a survey area using a movable object with at least one image capture device, the system comprising:
    a memory having instructions stored therein; and
    a controller including one or more processors configured to execute the instructions to:
    determine, based on a desired map resolution selected by a user, a flight path over the survey area for the movable object prior to flight;
    obtain images of the survey area captured by the at least one image capture device as the movable object travels along the flight path;
    process the images to generate the real-time map of the survey area with the desired map resolution;
    identify a missing region in the real-time map of the survey area;
    modify the flight path to capture images corresponding to at least a portion of the missing region;
    obtain sensing data from one or more sensors of the movable object, the sensing data comprising position information or attitude information of the movable object; and
    determine camera pose information associated with each image captured by the at least one image capture device based at least in part on the obtained sensing data,
    wherein determining the flight path comprises:
    determining, based on the desired map resolution, one or more of a height of the movable object, a speed of the movable object, a geographic distance between way points of the flight path, or a frequency for capturing images, and
    wherein processing the images to generate the real-time map comprises:
    generating a point cloud from each of the images;
    generating a digital elevation model (DEM) of the survey area by filtering each of the generated point clouds;
    rectifying each of the images based at least in part on the DEM and camera pose information associated with each of the images to generate rectified images;
    generating orthoimages with geographic coordinates based on the rectified images; and
    stitching the orthoimages to create the real-time map of the survey area.

13. The system of claim 12, wherein the one or more processors are further configured to, when determining the flight path:
  determining, based on the desired map resolution, the height of the movable object, the speed of the movable object, the geographic distance between way points of the flight path, and the frequency for capturing images.

14. An unmanned aerial vehicle (UAV), comprising:
  a propulsion device;
  a communication device;
  at least one image capture device;
  a power storage device configured to power the propulsion device and the communication device;
  a memory storing instructions; and
  a controller in communication with the communication device and configured to control the UAV to generate a real-time map, the controller comprising one or more processors configured to execute the instructions to:
    identify a survey area;
    determine, based on a desired map resolution selected by a user, a flight path over the survey area for the UAV prior to flight;
    obtain images of the survey area captured by the at least one image capture device as the UAV travels along the flight path;
    process the images to generate the real-time map of the survey area with the desired map resolution;
    identify a missing region in the real-time map of the survey area;
    modify the flight path to capture images corresponding to at least a portion of the missing region;
    obtain sensing data from one or more sensors of the movable object, the sensing data comprising position information or attitude information of the movable object; and
    determine camera pose information associated with each image captured by the at least one image capture device based at least in part on the obtained sensing data,
  wherein determining the flight path comprises:
    determining, based on the desired map resolution, one or more of a height of the movable object, a speed of the movable object, a geographic distance between way points of the flight path, or a frequency for capturing images, and
  wherein processing the images to generate the real-time map comprises:
    generating a point cloud from each of the images;
    generating a digital elevation model (DEM) of the survey area by filtering each of the generated point clouds;
    rectifying each of the images based at least in part on the DEM and camera pose information associated with each of the images to generate rectified images;
    generating orthoimages with geographic coordinates based on the rectified images; and
    stitching the orthoimages to create the real-time map of the survey area.

15. The UAV of claim 14, wherein the one or more processors are further configured to, when determining the flight path, execute the instructions to:
  determining, based on the desired map resolution, the height of the movable object, the speed of the movable object, the geographic distance between way points of the flight path, and the frequency for capturing images.

* * * * *